Patented Mar. 20, 1923.

1,449,067

UNITED STATES PATENT OFFICE.

WALTER O. SNELLING, OF ALLENTOWN, PENNSYLVANIA.

MANUFACTURE OF INK.

No Drawing.  Application filed April 20, 1920.  Serial No. 375,326.

*To all whom it may concern:*

Be it known that I, WALTER O. SNELLING, a citizen of the United States, residing at Allentown, in the county of Lehigh and State of Pennsylvania, have invented certain Improvements in the Manufacture of Ink, of which the following is a specification.

My invention relates to improvements in the manufacture of ink, and more particularly to improvements in the manufacture of writing inks of permanent character, and which will not fade or bleach out when exposed to light or chemical agencies.

Writing inks may be roughly classified into three groups, one consisting of solutions of coal-tar dyes or other like organic coloring materials in water or aqueous solution, a second group consisting of aqueous solutions of iron tannate or like salt of a metal and an organic acid, and a third group consisting of solutions of Prussian blue or other water-insoluble material in a solution of oxalic acid or other appropriate solvent. One purpose of my invention is to prepare inks having the desirable properties of the iron tannate inks, but which are still more resistant to the action of light and chemical agents.

As one example of my invention, I will describe the method which I employ in making an ink from coal-tar compounds, but which differs from the ordinary ink made from coal-tar dyes in being a suspension of an insoluble organic dye material, instead of being an aqueous solution of a dye, and which, unlike most inks containing coal-tar compounds, is extraordinarily resistant to actinic rays, ultra-violet light, and chemical agencies. I first take a soluble salt of aniline, such for example as aniline hydrochloride, and prepare an aqueous solution of same. I preferably use 20 g. of aniline hydrochloride to each liter of water, but I may use more or less than this quantity, dependent upon the density of the final ink which I desire. I next add to my aqueous solution of aniline hydrochloride a protective colloid, such substances, as gelatin, soluble starch, or other like materials being suitable for my purpose. I prefer to use an amount of such protective colloid equal to or greater than the amount of aniline salt which I have present in my solution. I next bring about the oxidation of my aniline hydrochloride to form aniline black, for this purpose preferably adding a small amount of potassium bichromate or other oxidizing agent to my solution, followed by agitation with air. Under these conditions the aniline hydrochloride undergoes complicated chemical changes, forming a very insoluble and resistant material, the composition of which is unknown. As normally prepared aniline black is insoluble in water, and rapidly separates out from any solution in which it is formed, but when prepared in the manner which I have described, the separate molecules or small molecular aggregates are prevented from agglomerating together to form aggregates which are sufficiently large to separate from the solution, and I find that the separate molecules, or groups of molecules of colloidal size, tend to remain suspended indefinitely in my aqueous medium, this giving an ink which depends for its tinctorial power upon suspended particles of minute size of the solid extremely inert and unalterable aniline black.

Instead of using aniline hydrochloride as a base for my new ink, I may use other organic compounds which yield suitable solid compounds insoluble in water, and I have found that the presence of p-phenylenediamine or p-aminophenol, particularly when present as the hydrochlorides in the presence of aniline, yield very insoluble oxidation products of black color, and which remain suspended indefinitely as submicroscopic particles when treated as herein described. By "submicroscopic" I mean particles so small as to be invisible in an ordinary microscope, and which can only be recognized by the ultramicroscope or equivalent agency. Instead of potassium bichromate I may use other agents for transforming my water-soluble organic compounds into water-insoluble suspended particles of submicroscopic size. I have successfully used chromic acid, ozone, potassium permanganate and other like agents, and even air or oxygen may be successfully used in bringing about the chemical change, particularly when small traces of iron or other substance capable of acting as a catalyst is present. A small amount of copper sulfate or nitrate is well known to act as a particularly efficient catalyst in the formation of aniline black.

In a modified form of my invention, I take a water-insoluble solid body such as aniline black or carbon black, and suspend it in water, or a solution of a protective colloid. As is well known, such a suspension is not permanent, and in the course of a few hours the suspended particles will entirely separate from the solution. While the coarse particles are still in suspension however, and before they have had the opportunity to settle, and while preventing such settling by constant stirring, I break down the large particles of the suspended material to colloidal size. With different kinds of suspended particles, different agents for breaking down the large particles to submicroscopic size may be used, but with most materials I find that a solution of tannin in water is highly efficient. Instead of a solution of tannin I may use ammonium tannate or a gallotannate. By violently agitating my suspension, or by passing the suspension between grinding plates, or by other suitable means I assist in breaking down the larger particles which are present in my suspension, and in reducing them to submicroscopic or colloidal size. If no protective colloid was present in the fluid used in breaking down the solid body to finely divided particles, I then add to my suspension, after removing by filtration or by sedimentation such coarse particles as have not been sufficiently finely divided to remain permanently suspended, a protective colloid such as gelatin, and in this way I obtain an ink which, although not equal in quality to that obtained by the method first described, is yet very superior to ordinary writing inks. There are a very large number of water-insoluble agents which I may use in preparing inks by this last method, but I prefer to employ aniline black or carbon black. As is well known, these materials are insoluble in water, and under normal conditions will not remain suspended in water to form an ink, except when present in a very concentrated solution of a heavy material such as glue or glycerin. By my process of reducing the carbon black or aniline black to particles of colloidal size, and suspending these particles in a very dilute solution of a protective colloid, I am able however, to prepare writing inks from carbon black, or aniline black, or other similar insoluble material which have very desirable properties, and which are extremely permanent and resistant to light and to chemical agencies.

I am aware that aniline black has previously been used in ink, by being partially dissolved in a strong alcoholic solution, but I do not claim such solutions of aniline black, but only suspensions of colloidal aniline black in a liquid in which the aniline black is insoluble, and in which the submicroscopic particles are prevented from agglomerating and forming large aggregates which will separate out and fall to the bottom, through the presence of a protective colloid in the suspension.

I am also aware that ordinary india ink, which has been made and used by the Chinese for many centuries, consists of particles of lamp black held in suspension in a glue solution, and that ink containing particles of lamp black in a thick solution of glue is in common use as a drawing ink, and is well known in the art. This product differs materially from the ink made by my invention however, since the particles of lamp black are not submicroscopic in size, and are kept in suspension only through the use of a thick and viscous fluid. Ink made according to my present invention may be distinguished from ink of the types at present known containing lamp black, through the fact that all of the particles in my new product are of submicroscopic size, and are in colloidal suspension, but not in solution.

I am also aware that carbon black and graphite have been prepared in colloidal condition, and that in such colloidal condition have been proposed as pigments in the manufacture of printing ink. I do not claim such use of colloidal carbon black or graphite, or their use in suspension in an oily vehicle, where the coalescence of the finely divided pigment is prevented by its being present in an oily medium of high viscosity, my invention being limited to the preparation of ink from finely divided solid materials in an aqueous medium, the coalescence of the finely divided particles being prevented by the presence of a protective colloid in the aqueous suspension.

The basis of my invention is my discovery that by reducing a chemical substance insoluble in water to particles of submicroscopic size, or by producing such substance in particles of submicroscopic size through chemical action, and preventing the agglomeration of such particles of submicroscopic size through the presence of a protective colloid, inks of great permanency and great resistance to alteration by chemical agents may be prepared.

It will be evident that many modifications may be made without departing from the spirit and scope of my invention and it is therefore to be understood that no limitations are to be imposed upon my invention unless indicated in the appended claims.

I claim:

1. In the manufacture of ink, the process which comprises reducing particles of an insoluble body to submicroscopic size whil suspended in an aqueous fluid in which such body is insoluble, and adding a protective colloid to the suspension so prepared.

2. In the manufacture of ink, the process which comprises reducing a solid, water-insoluble body to particles of submicroscopic size, suspending such particles in an aqueous fluid, and preventing the precipitation of such particles by the presence of a protective colloid.

In testimony whereof, I have hereunto subscribed my name this 19th day of April 1920.

WALTER O. SNELLING.